(12) United States Patent
Hammad et al.

(10) Patent No.: US 8,427,317 B2
(45) Date of Patent: Apr. 23, 2013

(54) APPARATUS AND METHOD TO ELECTROMAGNETICALLY SHIELD PORTABLE CONSUMER DEVICES

(75) Inventors: Ayman Hammad, Pleasanton, CA (US); Phil Dixon, San Diego, CA (US)

(73) Assignee: Visa U.S.A., San Francisco, CA (US)

( * ) Notice: Subject to any disclaimer, the term of this patent is extended or adjusted under 35 U.S.C. 154(b) by 398 days.

(21) Appl. No.: 12/273,017

(22) Filed: Nov. 18, 2008

(65) Prior Publication Data

US 2009/0146814 A1 Jun. 11, 2009

Related U.S. Application Data

(63) Continuation of application No. 11/165,901, filed on Jun. 24, 2005, now Pat. No. 7,482,925.

(51) Int. Cl.
G08B 13/14 (2006.01)
H01Q 1/32 (2006.01)
(52) U.S. Cl.
USPC .......... 340/572.1; 340/572.8; 340/5.74; 343/841; 343/872
(58) Field of Classification Search .... 340/572.1–572.7, 340/572.8, 5.4, 5.41, 5.65, 5.74; 343/841, 343/842, 872, 873; 455/410, 411, 575.5; 235/380–384; 174/377–380
See application file for complete search history.

(56) References Cited

U.S. PATENT DOCUMENTS

| | | | |
|---|---|---|---|
| 4,851,610 A * | 7/1989 | LeBlanc et al. | 174/353 |
| 5,090,563 A | 2/1992 | Becker | |
| 5,288,942 A | 2/1994 | Godfrey | |
| 5,335,366 A | 8/1994 | Daniels | |
| 5,465,206 A | 11/1995 | Hilt et al. | |
| 5,477,038 A | 12/1995 | Levine et al. | |
| 5,500,513 A | 3/1996 | Langhans et al. | |
| 5,583,318 A | 12/1996 | Powell | |
| 5,594,200 A | 1/1997 | Ramsey | |
| 5,621,201 A | 4/1997 | Langhans et al. | |
| 5,941,375 A | 8/1999 | Kamens et al. | |
| 6,079,621 A | 6/2000 | Vardanyan et al. | |
| 6,121,544 A | 9/2000 | Petsinger | |
| 6,127,938 A | 10/2000 | Friedman | |

(Continued)

FOREIGN PATENT DOCUMENTS

CN 2588732 11/2003
DE 9015824 2/1991

(Continued)

OTHER PUBLICATIONS

European Search Report issued Mar. 10, 2010 from European Patent Application No. 08020393, 5 pages.

(Continued)

*Primary Examiner* — Toan N Pham
(74) *Attorney, Agent, or Firm* — Kilpatrick, Townsend & Stockton

(57) ABSTRACT

An apparatus and method is provided to shield contactless portable electronic consumer devices such as radio frequency identification devices (RFID), tokens, mini-cards, key fobs, cellular phones, smartcards, etc. from wireless interrogation. In one embodiment, a contactless portable consumer device which includes a first antenna is shielded from unauthorized wireless interrogation with a radio frequency (RF) shield. The RF shield includes electrically conductive, non-ferromagnetic material and is configured to prevent unauthorized data transfer between a second antenna external to the portable consumer device and the first antenna.

24 Claims, 5 Drawing Sheets

U.S. PATENT DOCUMENTS

| | | | |
|---|---|---|---|
| 6,247,129 B1 | 6/2001 | Keathley et al. | |
| 6,359,216 B1 | 3/2002 | Liu | |
| 6,400,270 B1 | 6/2002 | Person | |
| 6,502,135 B1 | 12/2002 | Munger et al. | |
| 6,560,581 B1 | 5/2003 | Fox et al. | |
| 6,588,660 B1 | 7/2003 | Buescher et al. | |
| 6,646,554 B1 | 11/2003 | Goff et al. | |
| 6,759,736 B2 | 7/2004 | Bohmer et al. | |
| 6,785,519 B2 | 8/2004 | Toyoda et al. | |
| 6,826,616 B2 | 11/2004 | Larson et al. | |
| 6,837,425 B2 | 1/2005 | Gauthier et al. | |
| 6,845,863 B1 * | 1/2005 | Riley | 206/39 |
| 6,859,831 B1 | 2/2005 | Gelvin et al. | |
| 6,920,611 B1 | 7/2005 | Spaeth et al. | |
| 7,007,840 B2 | 3/2006 | Davis | |
| 7,039,611 B2 | 5/2006 | Devine | |
| 7,051,923 B2 | 5/2006 | Nguyen et al. | |
| 7,081,865 B2 | 7/2006 | Wu et al. | |
| 7,083,083 B2 * | 8/2006 | Droz | 235/375 |
| 7,104,446 B2 | 9/2006 | Bortolin et al. | |
| 7,121,456 B2 | 10/2006 | Spaeth et al. | |
| 7,124,937 B2 | 10/2006 | Myers et al. | |
| 7,152,780 B2 | 12/2006 | Gauthier et al. | |
| 7,187,959 B2 | 3/2007 | Ponce De Leon et al. | |
| 7,243,840 B2 * | 7/2007 | Bason et al. | 235/380 |
| 7,243,853 B1 | 7/2007 | Levy et al. | |
| 7,280,981 B2 | 10/2007 | Huang et al. | |
| 7,701,408 B2 | 4/2010 | Bombay et al. | |
| 7,784,684 B2 | 8/2010 | Labrou et al. | |
| 7,956,294 B2 | 6/2011 | Philips | |
| 2002/0013473 A1 | 1/2002 | Grubbs et al. | |
| 2002/0031997 A1 | 3/2002 | Lawler, Jr. et al. | |
| 2002/0046351 A1 | 4/2002 | Takemori et al. | |
| 2002/0158747 A1 | 10/2002 | McGregor et al. | |
| 2003/0119459 A1 | 6/2003 | Carillo et al. | |
| 2003/0233292 A1 | 12/2003 | Richey et al. | |
| 2004/0019522 A1 | 1/2004 | Bortolin et al. | |
| 2004/0044621 A1 | 3/2004 | Huang et al. | |
| 2004/0050922 A1 | 3/2004 | Gauthier et al. | |
| 2004/0054581 A1 | 3/2004 | Redford et al. | |
| 2004/0054590 A1 | 3/2004 | Redford et al. | |
| 2004/0054591 A1 | 3/2004 | Spaeth et al. | |
| 2004/0117514 A1 | 6/2004 | Nelms et al. | |
| 2004/0139021 A1 | 7/2004 | Reed et al. | |
| 2004/0148224 A1 | 7/2004 | Gauthier et al. | |
| 2004/0153715 A1 | 8/2004 | Spaeth et al. | |
| 2004/0220964 A1 | 11/2004 | Shiftan et al. | |
| 2005/0021456 A1 | 1/2005 | Steele et al. | |
| 2005/0029344 A1 | 2/2005 | Davis | |
| 2005/0036611 A1 | 2/2005 | Seaton et al. | |
| 2005/0045718 A1 | 3/2005 | Bortolin et al. | |
| 2005/0050367 A1 | 3/2005 | Burger et al. | |
| 2005/0058427 A1 | 3/2005 | Nguyen et al. | |
| 2005/0071225 A1 | 3/2005 | Bortolin et al. | |
| 2005/0071226 A1 | 3/2005 | Nguyen et al. | |
| 2005/0071227 A1 | 3/2005 | Hammad et al. | |
| 2005/0071228 A1 | 3/2005 | Bortolin et al. | |
| 2005/0071235 A1 | 3/2005 | Nguyen et al. | |
| 2005/0073415 A1 | 4/2005 | Shafir | |
| 2005/0102234 A1 | 5/2005 | Devine | |
| 2005/0121506 A1 | 6/2005 | Gauthier et al. | |
| 2005/0149455 A1 | 7/2005 | Bruesewitz et al. | |
| 2005/0283416 A1 | 12/2005 | Reid et al. | |
| 2005/0283430 A1 | 12/2005 | Reid et al. | |
| 2005/0283431 A1 | 12/2005 | Reid et al. | |
| 2005/0283432 A1 | 12/2005 | Reid et al. | |
| 2005/0283433 A1 | 12/2005 | Reid et al. | |
| 2006/0017570 A1 | 1/2006 | Moskowitz et al. | |
| 2006/0044206 A1 * | 3/2006 | Moskowitz et al. | 343/841 |
| 2006/0080243 A1 | 4/2006 | Kemper et al. | |
| 2006/0124748 A1 | 6/2006 | Osborn et al. | |
| 2006/0155644 A1 | 7/2006 | Reid et al. | |
| 2006/0163345 A1 | 7/2006 | Myers et al. | |
| 2006/0178957 A1 | 8/2006 | LeClaire | |
| 2006/0179007 A1 | 8/2006 | Davis | |
| 2006/0208066 A1 | 9/2006 | Finn et al. | |
| 2006/0254815 A1 * | 11/2006 | Humphrey et al. | 174/380 |
| 2006/0290501 A1 | 12/2006 | Hammad et al. | |
| 2006/0293027 A1 | 12/2006 | Hammad et al. | |
| 2007/0001000 A1 | 1/2007 | Nguyen et al. | |
| 2007/0001001 A1 | 1/2007 | Myers et al. | |
| 2007/0005613 A1 | 1/2007 | Singh et al. | |
| 2007/0005774 A1 | 1/2007 | Singh et al. | |
| 2007/0012764 A1 | 1/2007 | Bortolin et al. | |
| 2007/0017970 A1 | 1/2007 | Gauthier et al. | |
| 2007/0034679 A1 | 2/2007 | Gauthier et al. | |
| 2007/0055597 A1 | 3/2007 | Patel et al. | |
| 2007/0055630 A1 | 3/2007 | Gauthier et al. | |
| 2007/0057034 A1 | 3/2007 | Gauthier et al. | |
| 2007/0057051 A1 | 3/2007 | Bortolin et al. | |
| 2007/0083465 A1 | 4/2007 | Ciurea et al. | |
| 2007/0100691 A1 | 5/2007 | Patterson | |
| 2007/0109130 A1 | 5/2007 | Edenfield | |
| 2007/0125842 A1 | 6/2007 | Antoo et al. | |

FOREIGN PATENT DOCUMENTS

| | | |
|---|---|---|
| EP | 0 822 513 A2 | 2/1998 |
| EP | 1 313 027 A1 | 5/2003 |
| EP | 1503448 | 2/2005 |
| EP | 1 542 429 A1 | 6/2005 |
| EP | 1764860 | 3/2007 |
| GB | 2238344 | 5/1991 |
| JP | 2002/092564 A | 3/2002 |

OTHER PUBLICATIONS

U.S. Appl. No. 11/998,168, filed Nov. 28, 2007.
U.S. Appl. No. 12/332,990, filed Dec. 11, 2008.
English language translation to Search/Examination Report dated May 28, 2010 from Chinese Patent Application No. 2006800277164, 7 pages.
U.S. Appl. No. 60/667,864, filed Apr. 1, 2005, entitled, "System and method for protection against skimming of information from contactless cards," 2 pages.
Office Action mailed Jan. 31, 2012 in U.S. Appl. No. 12/332,990, 15 pages.
Office Action mailed Aug. 10, 2012 in U.S. Appl. No. 12/332,990, 15 pages.

\* cited by examiner

APPARATUS AND METHOD TO ELECTROMAGNETICALLY SHIELD PORTABLE CONSUMER DEVICES

CROSS-REFERENCES TO RELATED APPLICATIONS

This patent application is a continuation of and claims priority to U.S. patent application Ser. No. 11/165,901, filed on Jun. 24, 2005, now U.S. Pat. No. 7,482,925 which is incorporated herein by reference for all purposes.

BACKGROUND OF THE INVENTION

The present invention relates in general to radio frequency shielding and in particular to various embodiments of shielding for portable electronic devices such as contactless smartcards.

Generally, portable electronic devices such as contactless smartcards, key fobs, radio frequency identification devices (RFID), cellular phones, etc. are designed to provide the consumer a way to engage in wireless communication and data exchange using radio frequency (RF) signals. For example, contactless smartcards allow a consumer to store and transmit financial data and other personal data to third parties such as banks. In another example, portable electronic devices such as RFIDs are used to wirelessly identify articles and allow monitoring of such articles during manufacturing, shipment, storage, etc. Due to the increased popularity of smartcards and RFIDs, it is envisioned that they will eventually be used for virtually all transactions involved in banking, health, insurance, social security, tracking, shipping, etc.

Because contactless electronic devices can operate without wires, contactless portable electronic devices are expected to replace other types of devices that require physical contact and/or physical connections to communicate with other devices and systems. Illustratively, contactless smartcards are expected to replace regular credit cards, as they need not be in contact with a transaction terminal to be operated. Regular contact credit cards having magnetic strips and contact smartcards must come in contact with a reader. Similarly, RFIDs are expected to replace many of the bar code reading systems due to the fact that articles may be identified and tracked wirelessly.

A major benefit of contactless portable electronic devices is that they do not have to be removed from a user's wallet, briefcase, backpack, or purse to be used. Currently, an international standard has been established that sets a standard range between a contactless reader and the contactless portable electronic device. Therefore, a contactless portable electronic device may wirelessly exchange data with a contactless reader without the user having to remove the contactless portable electronic device from his wallet, purse, pocket, etc. as long as he is in range of the contactless reader. For simplicity and cost savings, contactless portable electronic devices often do not have embedded power sources (i.e., batteries). For example, smartcards and RFIDs have an antenna designed to receive RF signals from the contactless reader that is used to both power the smartcard/RFID devices, as well as enable them to communicate with the contactless reader.

Unfortunately, due to the wireless nature of the contactless portable electronic devices, it is entirely possible that a contactless reader may be used for surreptitious interrogation (e.g., data skimming) of the contactless portable electronic devices. In addition, it is conceivable that a contactless reader may be developed or modified to generate a much greater RF signal strength and sensitivity and thereby increase the standard range. Such an enhanced reader may allow surreptitious interrogation of the contactless portable electronic devices from a greater range.

Some have proposed using a passive electromagnetic shield to prevent surreptitious interrogation. One particular reference that describes creating a passive electromagnetic shield is U.S. Pat. No. 6,121,544 issued to Petsinger (herein Petsinger). Petsinger discloses an electromagnetic shield device that is used to shield contactless smartcards and RFIDs from electromagnetic energy. Petsinger teaches a specialized enclosure that is made of a soft magnetic alloy with a very high initial and maximum magnetic permeability. The enclosure is hydrogen annealed to provide magnetic shielding properties. Petsinger also discloses that the relatively high intrinsic electrical conductivity of the magnetic shielding simulates a Faraday cage to protect the contactless smartcards/RFIDs from electric fields as well. Unfortunately, the electromagnetic shield as taught by Petsinger is a complicated multifaceted device that is expensive to manufacture and requires that the smartcard/RFID be completely enclosed by magnetic materials.

The device in Petsinger also appears to be rigid in structure. The rigidity of Petsinger's device may make the device undesirable for use in a person's wallet, since a person's wallet is continually subjected to varying forces when it is in a person's pocket. The rigid device may break or crack when subjected to such forces.

Therefore, what is needed is a shielding device and method that shields the contactless portable electronic devices from unauthorized interrogation that is simple to use and is cost effective.

BRIEF SUMMARY OF THE INVENTION

Embodiments of the present invention provide an apparatus and method for shielding a contactless portable consumer device such as a smartcard, RFID, key FOB, tag, and the like from unauthorized wireless interrogation.

In one embodiment, the present invention provides a portable consumer device that includes a first antenna and an RF shield comprising an electrically conductive, non-ferromagnetic material. The RF shield is configured to prevent unauthorized data transfer between a second antenna external to the portable consumer device and the first antenna.

In another embodiment, the present invention provides a portable consumer device including a first antenna and an RF shield in the form of a sticker. The RF shield is configured to prevent unauthorized data transfer between a second antenna external to the portable consumer device and the first antenna.

In another embodiment, the present invention provides for an apparatus comprising: a portable consumer device comprising a first antenna, a flexible carrier, and an RF shield associated with the carrier. The RF shield is configured to prevent unauthorized data transfer between a second antenna external to the portable consumer device and the first antenna.

These and other embodiments of the invention are described in further detail below.

DETAILED DESCRIPTION OF THE INVENTION

Figure 1:
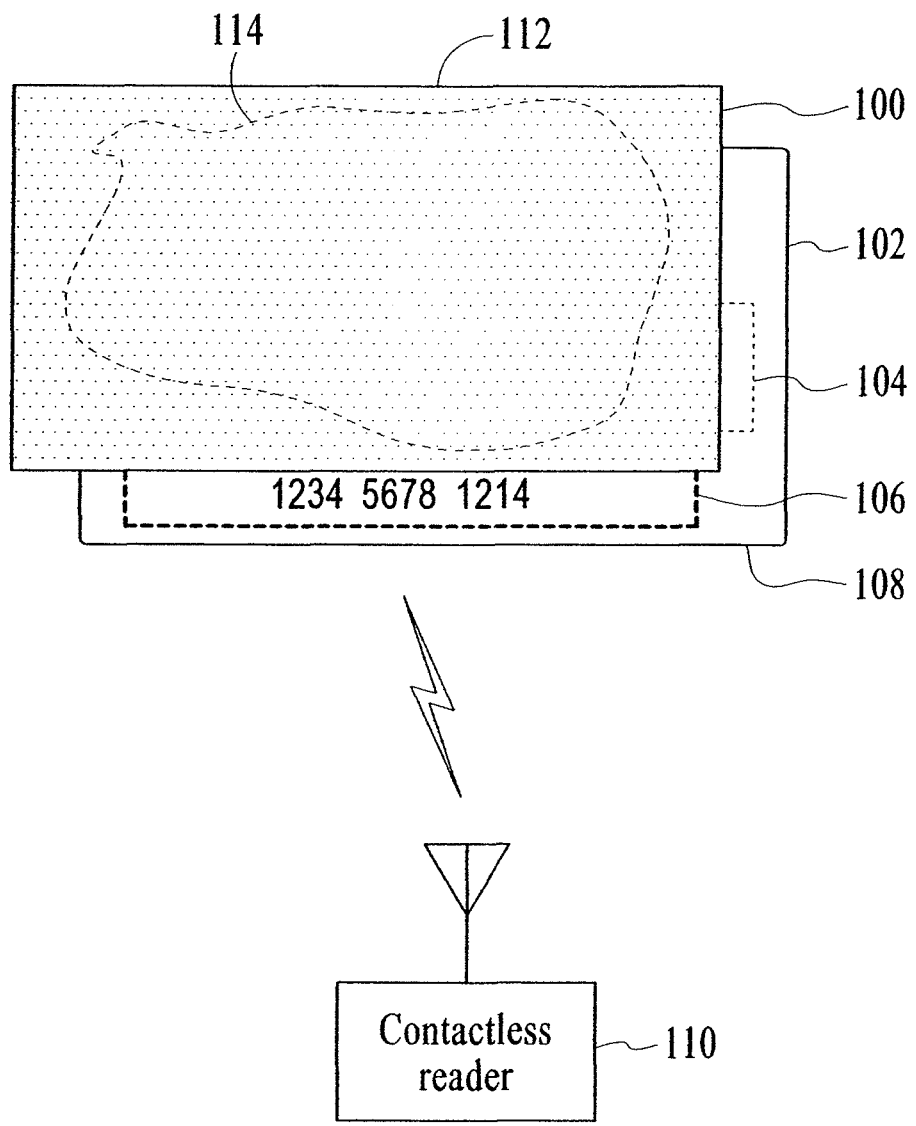
FIG. 1 is a front view illustrating one embodiment of an RF shield disposed with respect to a contactless portable consumer device in accordance with embodiments of the invention.

Embodiments of the present invention provide for an RF shield apparatus and method of shielding a contactless portable consumer device. In one embodiment, the RF shield has a particular shape, dimension, and/or non-ferromagnetic material. Such features allow the shield to block or attenuate RF signals within a predetermined frequency range and/or magnitude range so that unauthorized data transfer (e.g., the unauthorized transfer of bank account numbers) between a first antenna in a portable consumer device and a second antenna external to the portable consumer device does not occur. The antenna in the portable consumer device may be in any suitable form including a coil.

The portable consumer devices according to embodiments of the invention may be in any suitable form. For example, the portable consumer devices can be hand-held and compact so that they can fit into a consumer's wallet and/or pocket (e.g., pocket-sized). For example, the portable consumer devices may include smartcards, ordinary credit or debit cards (with a magnetic strip and without a microprocessor), a keychain device (such as the Speedpass commercially available from Exxon-Mobil Corp.), etc. Other examples of portable consumer devices include cellular phones, personal digital assistants (PDAs), pagers, payment cards, security cards, access cards, smart media, transponders, RFID flexible tags, and the like. Such portable consumer devices can have one or more antennas that can transmit and/or receive signals and data through a wireless communication medium.

An exemplary portable consumer device may include a memory such as a memory chip and/or a microprocessor. Either may be operationally coupled to the antenna in the portable consumer device. The memory preferably contains information such as financial information. Financial information may include information such as bank account information, credit or debit card number information, account balance information, consumer information, etc. If the portable consumer device is in the form of a debit, credit, or smartcard, the portable consumer device may also optionally have features such as magnetic strips. Such devices can operate in either a contact or contactless mode.

The portable consumer devices according to embodiments of the invention can be used with authorized readers that can also have antennas. Such authorized readers may be present at point of sale (POS) terminals, ATM (automatic teller machines), and the like. Such readers are well known in the art.

The RF shield may cover a portion of the portable consumer device or the entire portable consumer device. In embodiments of the invention, the RF shield covers one or both sides of the one or more antennas in the portable consumer device. It is well known in the RF art that RF shields can be created to reflect or absorb RF signals. Such shields may have a particular material that more readily reflects or absorbs signals of a certain wavelength, and/or may have a particular configuration that more readily reflects of absorbs signals of a certain wavelength.

FIG. 1 is a front view illustrating one embodiment of an RF shield 100 disposed with respect to a conventional contactless portable consumer device 102. For purposes of illustration, the RF shield 100 is described in terms of a rectangular shape. However, it is to be understood that RF shield 100 may have any shape as long as the shield 100 prevents the unauthorized transfer of data from the contactless portable consumer device 102. As shown in FIG. 1, the contactless portable consumer device 102 includes a processor 104 and an antenna 106. The processor 104 and antenna 106 are generally integrated into the body 108 of the contactless portable consumer device 102, such as the body 108 of a smartcard or RFID device or the like. Generally, the antenna 106 may be a first antenna and is configured to be sensitive to a specific spectrum of RF signals used with a contactless reader 110. In other words, the contactless portable consumer device 102 is designed to receive signals from the contactless reader 110 within a particular range of frequencies. The contactless reader 110 may include a second antenna which may transmit and/or receive a signal from the first antenna 106 in the contactless portable consumer device 102. Since the antenna 106 has a specific physical configuration, the sensitivity of the contactless portable consumer device 102 decreases dramatically for frequencies outside the frequency range of operation. In some cases, the contactless portable consumer device 102 may include a low pass or band pass filter system to further reject RF signals outside the frequency spectrum of interest.

In one embodiment, the RF shield 100 acts as a conductive partition placed between an antenna of the contactless reader 110 and the antenna 106 of the contactless portable consumer device 102. The RF shield 100 controls the propagation of electric fields from the antenna of the contactless reader 110 to the antenna 106 of the contactless portable consumer device 102. As the frequency range of operation is a known factor in the operation of contactless portable consumer device 102, the RF shield 100 may be designed to act as a signal attenuator within the range of that frequency range of operation. The RF shield 100 attenuates the RF signals, within that range of operation, below a device activation level thereby preventing any data transfer between the two antennas. For example, the antenna 106 may be configured to be a quarter wavelength antenna or multiple thereof, whereas the RF shield 100 is configured to either reflect or absorb (i.e. short) RF signals within the frequency range of operation of the contactless portable consumer device 102. In other words, the RF shield 100 acts as a mismatched antenna or an RF signal absorber to attenuate those frequencies used for the operation of the contactless portable consumer device 102 below an activation level thereby preventing data exchange.

To prevent electronic coupling of signals from the RF shield 100 to the antenna 106, the RF shield 100 can be placed in contact with and/or at the same ground as the contactless portable consumer device 102. The grounding contact (not shown) may be spatially separated from the antenna 106. The electrical contact between the RF shield 100 and the contactless portable consumer device 102 may be optionally enhanced using a conductive adhesive 114. Even though the body 108 of the contactless portable consumer device 102 may be composed of plastic or other polymers, the grounding paths are established though surface contact and/or paths in a carrier such as a wallet (as described below). The RF shield 100 is also configured with a conductive body 112 portion that provides one or more internal electrical paths for electric currents generated by the RF signals conducted by the conductive body 112. For example, the conductive body 112 may include non-ferromagnetic materials such as aluminum, copper, brass, and alloys that exhibit extremely low magnetic permeability but are electrically conductive. In other embodiments, the RF shield 100 may be composed of metallic printing ink, mesh materials, conductive fabrics, and the like that may be used to similar advantage. Non-ferromagnetic materials are particularly desirable. For example, metals such as aluminum are common, inexpensive, and easily manufacturable.

Figure 2:
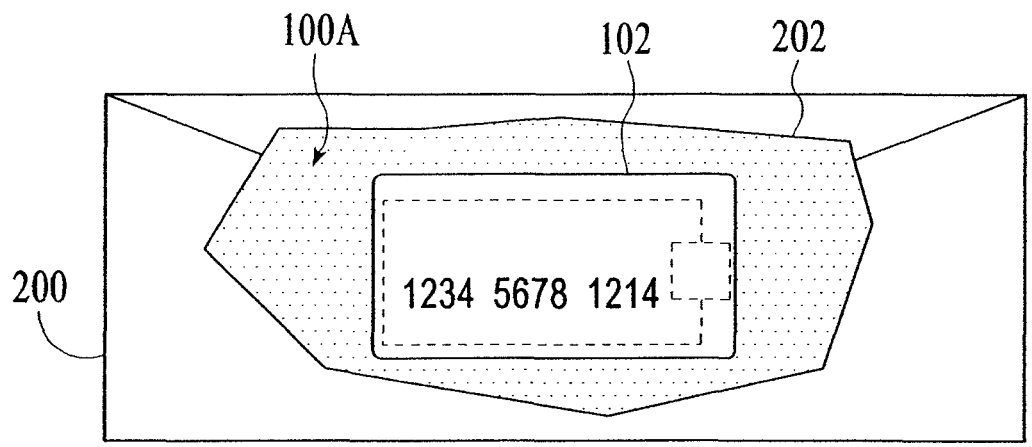
FIG. 2 is a front view illustrating one embodiment of an envelope having an RF shield disposed therein supporting a contactless portable consumer device in accordance with embodiments of the invention.

FIG. 2 is a front view illustrating one embodiment of an envelope 200 having an RF shield 100A disposed therein, and supporting a contactless portable consumer device 102. The envelope 200 is an example of a flexible carrier. For clarity, a common envelope shape is illustrated. However, it is to be understood that any type of envelope or enclosure shape and/or configuration capable of holding the contactless portable consumer device 102 may be used. The RF shield 100A may be separate from envelope 200, attached to the envelope 200, or integrally formed with the envelope 200. For example, the RF shield 100A may be a non-ferromagnetic conductive internal coating 202 of envelope 200. The coating 202 may be applied using any number of techniques such as painting, printing, stenciling, powder coating, vacuum metallization, and the like. The coating 202 has a thickness and a structure that allows that coating 202 to absorb or reflect RF signals. The coating 202 may be applied to selective areas of the envelope 200 to form the RF shield 100A. The formed RF shield 100A can block or attenuate the RF signals from an unauthorized external antenna. In another embodiment, the RF shield 100A may be in the form of a non-ferromagnetic foil that is in a pouch, or in the form of an envelope liner insert (as described below).

In another embodiment, the contactless portable consumer device 102 may be a contactless identification device, such as an RFID, used to identify and/or track articles in storage or being shipped. The RF shield 100 and contactless identification device may be designed to attach to articles, such as consumer goods. Any number of configurations may be used to attach the RF shields 100 and the contactless identification device to such articles. For example, the contactless identification device and the RF Shield 100 may be attached or integral to an identification tag, e.g., luggage tag, or contained in a pouch similar to RF shield 100A described above, and the like.

Figure 3:
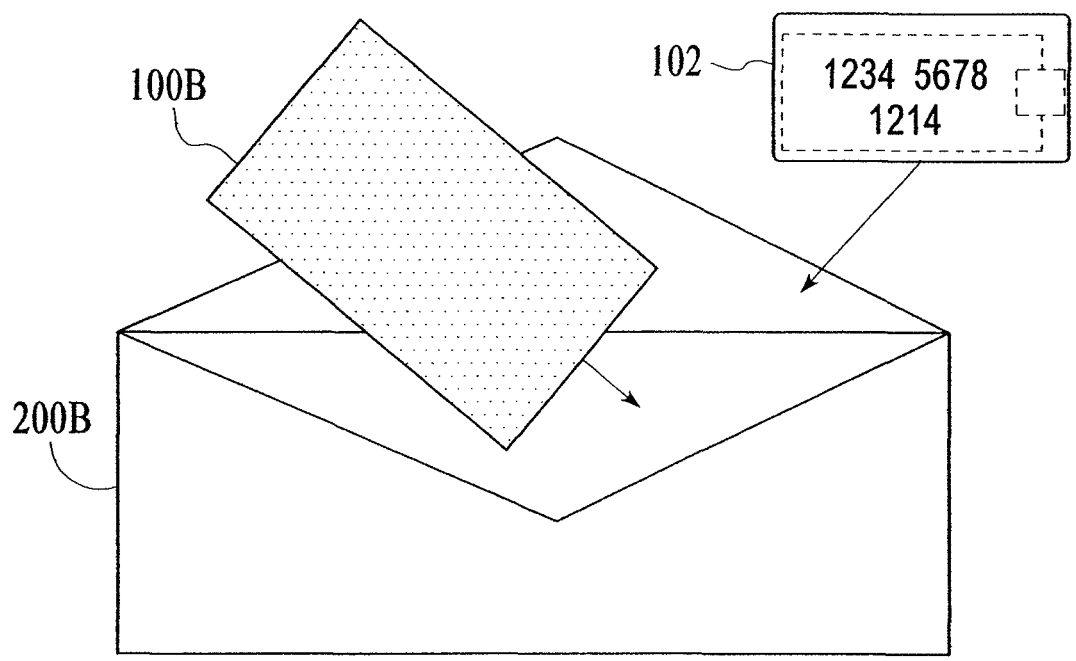
FIG. 3 is a front view illustrating one embodiment of an envelope having an RF shield insert for insertion therein in accordance with embodiments of the invention.

FIG. 3 is a front view illustrating one embodiment of an envelope 200B having an RF shield insert 100B that is inserted therein. In one embodiment, the RF shield insert 100B is sized to fit snuggly within the envelope 200B. RF shield 100B is positioned within envelope 200B in close proximity to contactless portable consumer device 102 such that, similar to RF shield 100 described with respect to FIGS. 1-2, any RF signals within a predetermined frequency range are blocked or attenuated. Optionally, the contactless portable consumer device 102 may be secured to the RF shield 100B with a temporary adhesive.

Figure 4:
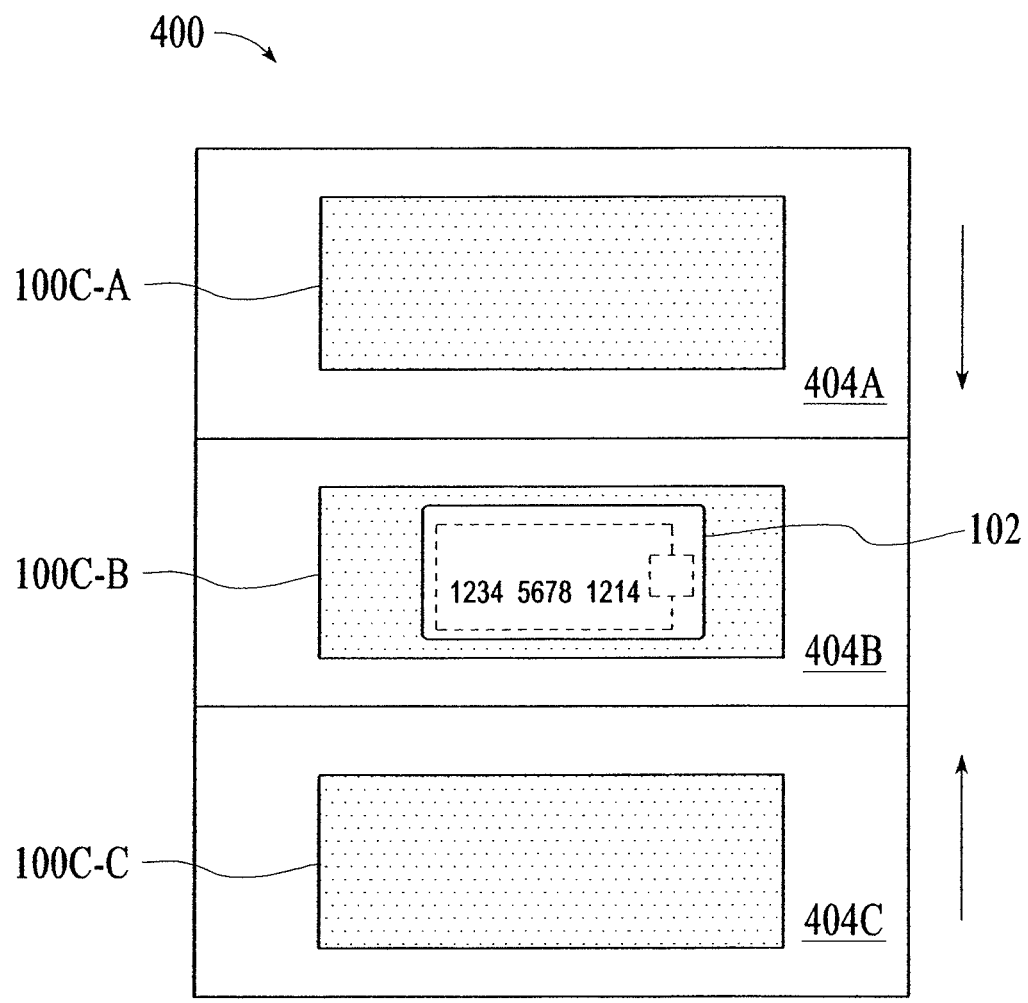
FIG. 4 is a front view illustrating one embodiment of an envelope insert having one or more RF shields disposed thereon with respect to a contactless portable consumer device in accordance with embodiments of the invention.

FIG. 4 is a front view illustrating one embodiment of an envelope insert 400 having one or more RF shields 100C-A, 100C-B, 100C-C disposed thereon and adjacent to a contactless portable consumer device 102. In this embodiment, the envelope insert 400 is a multi-fold carrier designed to fold around the contactless portable consumer device 102 mounted thereon. The envelope insert 400 may be optionally used to provide consumer information about the contactless portable consumer device 102 such as account numbers, the issuing institution, etc. The embodiment in FIG. 4 may be used to mail a credit or debit card to a consumer. As will be apparent from the description below, this embodiment protects the contactless portable consumer device 102 from unauthorized data access when the contactless portable consumer device 102 is being transported through the mail or the like.

As shown in FIG. 4, the envelope insert 400 includes one or more RF shields 100C-A, 100C-B, 100C-C. For example, as illustrated, there may be one RF shield per folding surface 404. Thus, when the envelope insert 400 is folded, the contactless portable consumer device 102 may be enclosed by the envelope insert 400 and surrounded by the one or more RF shields 100C-A, 100C-B, 100C-C. Because more than one shield 100C (e.g. 100C-A, 100C-B, 100C-C) shields the antenna in the contactless portable consumer device 102, the contactless portable consumer device 102 is very well protected against unauthorized data transfer from an unauthorized external antenna.

For added security, the one or more RF shields may be formed in different shapes and/or formed of different materials to accommodate a broader spectrum of RF signals. In some embodiments, the RF shields may be formed of foil, such as aluminum foil. Such foils may be adhesively attached to the envelope insert 400.

Any number of techniques may be used to apply the RF shields 100A-C to the envelope insert 400. For example, the RF shield 100C may be formed by printing conductive ink such as silver and graphite ink on the envelope insert 400. The RF shield 100C may also be formed by sputtering, painting, etc., conductive non-ferromagnetic metals to the envelope insert 400. In yet other embodiments, a film of non-ferromagnetic material may be glued or taped onto the envelope insert 400.

Figure 5A:
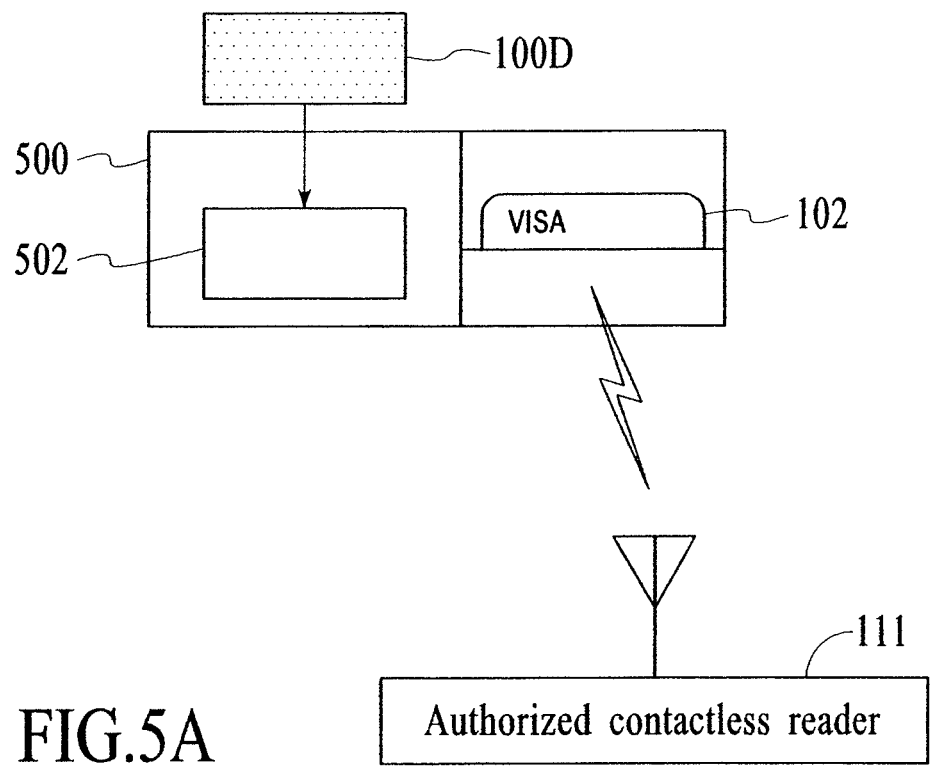
FIG. 5A is a front view illustrating one embodiment of a wallet having an RF shield disposed therein with respect to a contactless portable consumer device in accordance with embodiments of the invention.

FIG. 5A is a front view illustrating one embodiment of a wallet 500 having an RF shield 100D being disposed therein with respect to a contactless portable consumer device 102. In one embodiment, the RF shield 100D is designed to fit within a holder 502 of the wallet 500. The wallet 500 may be an example of a flexible carrier. The holder 502 may be any suitable storage area of the wallet 500 (e.g., pouch, recess, etc.). For example, the holder 502 may be a conventional credit card pocket. Illustratively, holder 502 may be configured to hold pictures or other items. RF shield 100D is configured to be positioned within holder 502 in proximity to contactless portable consumer device 102 such that, similar to RF shield 100 described with respect to FIGS. 1-3 above, any RF signals within a frequency range suitable for activating the contactless portable consumer device 102 are blocked attenuated below the device activation level. Whereas a shielded enclosure (e.g., as shown in FIG. 2) may prevent any RF signals from reaching the contactless portable consumer device 102 when closed, when the wallet 500 is open, as illustrated, an authorized contactless reader 111 may be used to interrogate the contactless portable consumer device 102. This is advantageous as it gives the user control of when the contactless portable consumer device 102 may be wirelessly interrogated.

Figure 5B:
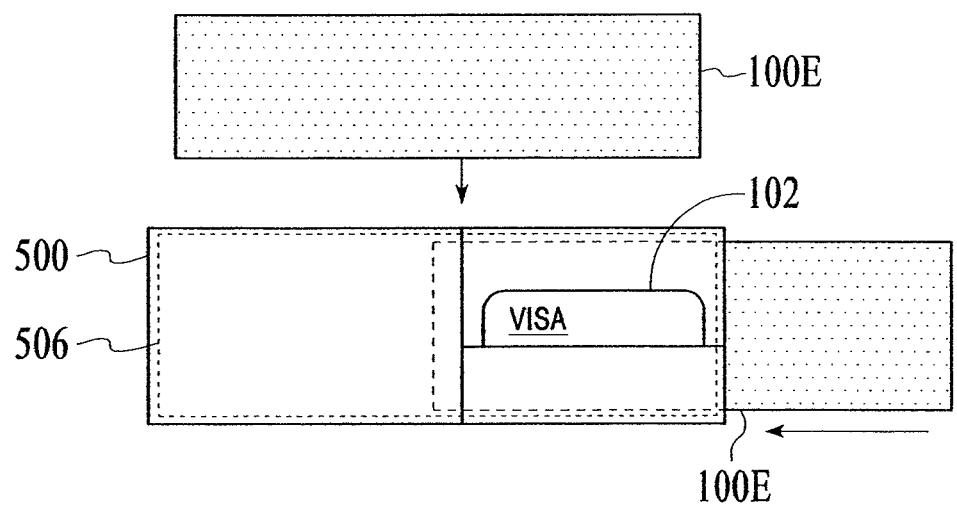
FIG. 5B is a front view illustrating one embodiment of a wallet having an RF shield liner disposed therein with respect to a contactless portable consumer device in accordance with embodiments of the invention.

FIG. 5B is a front view illustrating an embodiment of a wallet 500 having an RF shield liner 100E disposed therein with respect to a contactless portable consumer device 102. Similar to RF shield 100D described above, RF shield liner 100E is configured to be integrated with the wallet 500. In one embodiment, the RF shield liner 100E is configured to slip into a conventional momentary holding pocket 506 extending, for example, lengthwise along the wallet 500. In another embodiment, the RF shield liner 100E may be manufactured with the wallet 500 as a hidden liner. The RF shield liner 100E may also be integrated with the wallet 500 such that some or all of the RF shield liner 100E is in view. For example, the RF shield liner 100E may be formed of one or more layers of conductive materials with a specialized design, color, surfaces, etc., to enhance the uniqueness of the wallet's look and feel. In either case (as a separate liner, or integrated into the wallet 500), the RF shield liner 100E is configured to attenuate RF signals within the operation frequency range of the contactless portable consumer device 102 when the wallet 500 is folded into a closed configuration. The user of the wallet 500 may then use the contactless portable consumer device 102 by simply opening the wallet 500 and then holding the open wallet 500 so that the contactless portable consumer device 102 faces the authorized contactless reader 111 and is within an operational range of the authorized contactless reader 111. Advantageously, when the user positions the contactless portable consumer device 102 so that the authorized contactless reader 111 can read it, the RF shield liner 100E may shield the contactless portable consumer device 102 from surreptitious interrogation by unauthorized contactless readers 110 positioned on the side of the RF shield liner 100E opposite to the contactless portable consumer device 102. In another embodiment, similar to lining the wallet 500, the RF shield liner 100E may be configured to line a purse, pocket, or other article of clothing.

Figure 6:
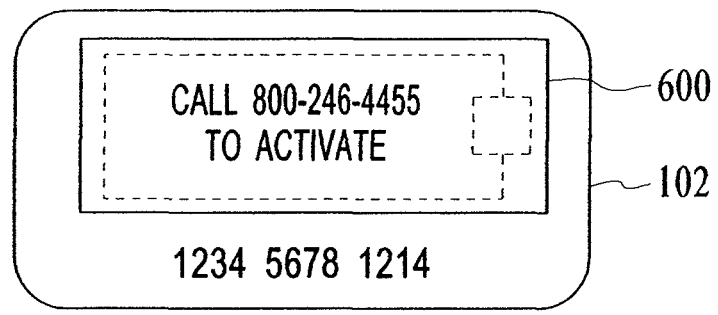
FIG. 6 is a front view illustrating one embodiment of an RF shield sticker disposed on a contactless portable consumer device in accordance with embodiments of the invention.

FIG. 6 is a front view illustrating one embodiment of an RF shield sticker 600 disposed on a contactless portable consumer device 102. In one embodiment, the sticker 600 is formed from one or more layers of non-ferromagnetic materials such as aluminum, copper, brass, stainless steel, and the like. The one or more layers of non-ferromagnetic materials may be formed in a flexible carrier such as a paper or polymeric substrate. The RF shield sticker 600 includes a temporary adhesive to temporarily affix the RF shield sticker 600 to the contactless portable consumer device 102. The adhesive may be virtually any type of adhesive as is known that temporarily bonds items together.

The RF shield stickers 600 may also have any suitable size or shape. The sizes and shapes of the RF shield stickers 600 may correspond to the shapes and sizes of the antennas. In addition, in some embodiments, the size, shape, and material used in the RF shield sticker 600 may be adjusted to optimize its attenuation properties relative to the frequency of operation for the particular contactless portable consumer device 102 being used. The stickers may also be printed with information pertinent to the user of the contactless portable consumer device 102. For example, the RF shield stickers 600 may contain information such as instructions regarding how to activate a contactless portable consumer device 102 (e.g., by dialing a toll-free number and then following the recorded instructions).

Figure 7A:
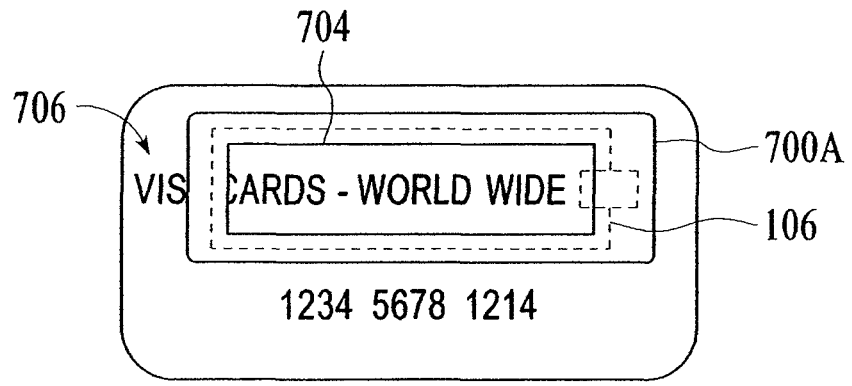
FIG. 7A is a front view illustrating one embodiment of an antenna shield mounted to a contactless portable consumer device for shielding small antennas in accordance with embodiments of the invention.
Figure 7B:
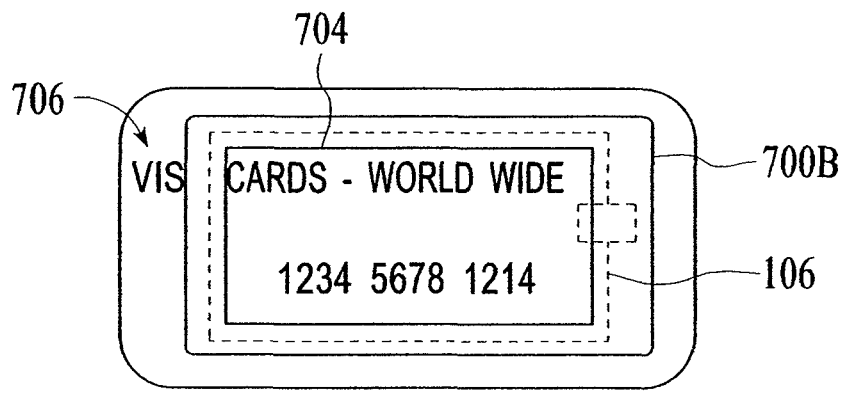
FIG. 7B is a front view illustrating one embodiment of an antenna shield mounted to a contactless portable consumer device for shielding larger antennas in accordance with embodiments of the invention.

FIG. 7A is a front view illustrating one embodiment of an antenna shield 700A mounted to a contactless portable consumer device 102 having a small sized antenna 106B. FIG. 7B is a front view illustrating one embodiment of an antenna shield 700B mounted to a contactless portable consumer device 102 with a larger antenna 106C. In FIG. 7A, the antenna shield 700A and the RF shield sticker 600 have similar configurations. However, while the antenna shield 700 is configured to shield the antenna 106, an opening 704 is formed so that card indicia 706 is visible to the user.

As noted above, the antenna shields 700A, 700B may be formed from one or more layers of non-ferromagnetic materials such as aluminum, copper, brass, stainless steel, and the like. The antenna shields 700A, 700B may include temporary adhesives to temporarily affix them to contactless portable consumer devices. The adhesive may be virtually any type of adhesive as is known that temporarily bonds items together. The antenna shield 700 may be formed in virtually unlimited shapes to accommodate the antenna size differences. In addition, the size and material of the antenna shield 700 may be chosen to optimize its attenuation properties relative to the frequency of operation for a particular contactless portable consumer device 102.

Embodiments of the invention provide for a number of advantages. Unlike the device described in the Petsinger reference noted above, embodiments of the invention can use less expensive non-ferromagnetic materials such as aluminum. When thousands of contactless credit or debit cards are mailed to consumers, the cost savings associated with embodiments of the invention, relative to the costs associated with Petsinger's device, can be significant. Such materials are also more widely available and can be better conductors than the ferromagnetic materials mentioned in Petsinger. They can thus provide for better shielding than the materials in Petsinger. In addition, in some embodiments, the shield can be on or in the form of a flexible carrier. If the portable consumer device is in the form of a credit card, the shield can bend and flex along with the credit card making it suitable for use in a person's wallet. In other embodiments, the RF shield 100 may be part of an active decoy system configured to actively prevent wireless interrogation. Exemplary embodiments of active wireless interrogation prevention may be found in co-pending patent application Ser. No. 11/165,969, entitled "Apparatus And Method For Preventing Wireless Interrogation Of Portable Consumer Devices" which is hereby incorporated by reference in its entirety.

It is apparent to one skilled in the art that various changes and modifications can be made to this disclosure, and equivalents employed, without departing from the spirit and scope of the invention. For example, RF shields 100 may be formed from a variety of different non-ferromagnetic materials such as polymers having one or more conductive layers to reduce other potentially damaging conditions such as the build up of static. Elements shown with any embodiment are exemplary for the specific embodiment and can be used on other embodiments within this disclosure.

What is claimed is:

1. An apparatus comprising:
a portable consumer device comprising a first antenna;
an envelope coupled to and surrounding the portable consumer device; and
an insert disposed in the envelope, the insert comprising an RF shield, the RF shield comprising an electrically conductive, non-ferromagnetic material, wherein the RF shield is configured to prevent unauthorized transfer of financial data between a second antenna external to the portable consumer device and the first antenna, wherein the RF shield is separate from the portable consumer device and only one side of the portable consumer device is shielded by the RF shield.

2. The apparatus of claim 1, wherein the non-ferromagnetic material comprises aluminum.

3. The apparatus of claim 1, wherein the portable consumer device is in the form of a card for performing financial transactions.

4. The apparatus of claim 1, wherein the portable consumer device is in the form of a card.

5. The apparatus of claim 1 further comprising an envelope wherein the envelope contains the portable consumer device and the RF shield.

6. The apparatus of claim 1, wherein the portable consumer device comprises a personal digital assistant, a pager, a payment card, a security card, an access card, a key fob, a smart medium, a transponder, or an RFID device.

7. The apparatus of claim 1, wherein the portable consumer device and the RF shield are configured to be attached to an item during storage or shipment.

8. The apparatus of claim 1, wherein the RF shield is in the form of a liner configured to line a purse, pocket, or other article of clothing.

9. The apparatus of claim 1, wherein financial data includes a bank account number.

10. The apparatus of claim 1 further comprising a second RF shield coupled to the RF shield, wherein the second RF shield is formed in a different shape and a different material from the RF shield.

11. The apparatus of claim 10 wherein the second RF shield is adhesively attached to the RF shield.

12. The apparatus of claim 1 wherein the RF shield comprises conductive ink.

13. The apparatus of claim 1 wherein the first antenna comprises an antenna grounding contact and the RF shield comprises a shield grounding contact; and
wherein the antenna grounding contact is electrically coupled to the shield grounding contact.

14. The apparatus of claim 1 wherein the RF shield is designed to reflect RF signals within a frequency range of operation of the antenna.

15. An apparatus comprising:
a portable consumer device comprising a first antenna; and
an envelope coupled to and surrounding the portable consumer device; and
an insert disposed in the envelope, the insert comprising an RF shield, the RF shield comprising an electrically conductive, non-ferromagnetic material, wherein the RF shield is configured to prevent unauthorized transfer of financial data between a second antenna external to the portable consumer device and the first antenna, wherein the RF shield is separate from the portable consumer device and only one side of the portable consumer device is shielded by the RF shield, and wherein the RF shield is further configured to attenuate a signal passing from the second antenna to the first antenna so that the signal that passes through the RF shield is below an activation threshold for the portable consumer device.

16. The apparatus of claim 15, wherein the non-ferromagnetic material comprises aluminum.

17. The apparatus of claim 15, wherein the portable consumer device is in the form of a card for performing financial transactions.

18. The apparatus of claim 15, wherein the portable consumer device is in the form of a card for performing identification functions.

19. The apparatus of claim 15 further comprising an envelope wherein the envelope contains the portable consumer device and the RF shield.

20. The apparatus of claim 15, wherein the portable consumer device comprises a personal digital assistant, a pager, a payment card, a security card, an access card, a key fob, a smart medium, a transponder, or an RFID device.

21. The apparatus of claim 15, wherein the portable consumer device and the RF shield are configured to be attached to an item during storage or shipment.

22. The apparatus of claim 15, wherein the RF shield is in the form of a liner configured to line a purse, pocket, or other article of clothing.

23. The apparatus of claim 15, wherein financial data includes a bank account number.

24. The apparatus of claim 15 wherein the portable consumer device further comprises a filter system to further reject RF signals outside a frequency spectrum of interest.

* * * * *